(12) United States Patent
Panchenko et al.

(10) Patent No.: US 7,721,274 B1
(45) Date of Patent: May 18, 2010

(54) INTELLIGENT PROCESSING OF EXTERNAL OBJECT REFERENCES FOR DYNAMIC LINKING

(75) Inventors: Maksim V. Panchenko, Union City, CA (US); Fu-Hwa Wang, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1403 days.

(21) Appl. No.: 10/839,653

(22) Filed: May 5, 2004

(51) Int. Cl.
*G06F 9/44* (2006.01)
*G06F 9/45* (2006.01)

(52) U.S. Cl. .................. 717/153; 717/111; 717/163; 717/165

(58) Field of Classification Search .................. None
See application file for complete search history.

(56) References Cited

OTHER PUBLICATIONS

Duggan, Dominic, "Type-Based Hot Swapping of Running Modules," *Proceedings of the Sixth ACM SIGPLAN International Conference on Functional Programming*, Florence, Italy, Sep. 3-5, 2001, pp. 1-30.

Franz, Michael, "Dynamic Linking of Software Components," *IEEE Computer*, vol. 30, No. 3, Mar. 1997, pp. 74-81.

Hicks, Michael et al., "Safe and Flexible Dynamic Linking of Native Code," *Selected Papers from the Third International Workshop on Types in Compilation*, R. Harper, Ed. *Lecture Notes in Computer Science*, vol. 2071, Springer-Verlag, London, 2001, pp. 147-176.

Inverardi, P. et al., "A Declarative Framework for Adaptable Applications in Heterogeneous Environments," *Proceedings of the 2004 ACM Symposium on Applied Computing*, Nicosia, Cyprus, Mar. 14-17, 2004, pp. 1177-1183.

*Primary Examiner*—Chuck O Kendall
(74) *Attorney, Agent, or Firm*—Dorsey & Whitney LLP (57) ABSTRACT

Performance information can be utilized for comparison of resolving an external object reference through a linking module against accessing the external object directly ("relocation processing"). With the performance information, a determination of whether performing relocation processing on a runtime linked external object reference provides improved runtime performance sufficient to outweigh the runtime linking overhead incurred from the relocation processing is made. If the improvement in runtime performance is sufficient, then the runtime linked external object reference, or the code section that includes the reference, is marked to indicate that relocation processing should be applied.

37 Claims, 6 Drawing Sheets

INTELLIGENT PROCESSING OF EXTERNAL OBJECT REFERENCES FOR DYNAMIC LINKING

BACKGROUND

1. Field of the Invention

The present invention relates to the field of computers. More specifically, the present invention relates to optimization.

2. Description of the Related Art

Executable files may include external object references to be linked at runtime. Some files or objects that are linked at runtime instead of during compile time include dynamically linked libraries, shared objects, and relocatable modules. The runtime linked objects are maintained separately from executable files that reference the runtime linked objects. A runtime linker/loader, embodied within an executable file or operating environment, finds runtime linked objects that are referenced in the executable file and loads the objects into execution space.

A link-editor can provide facilities for keeping segments that include external object references read-only. Keeping these segments as read-only causes each cross-module call or external data reference to be done through an extra redirection, such as a table, followed by a loading of the object's address. Keeping code segments as read-only code segments and calling external objects with redirection (or indirection) introduces application runtime overhead for external object function calls and external data references. Instead of calling external objects with redirection, the reference to the external object may be resolved directly ("relocation processing"). However, relocation processing introduces runtime linking overhead that may outweigh the redirection overhead. Accordingly, a technique is desired that intelligently processes external object references of a code unit to be resolved either directly or indirectly.

SUMMARY OF THE INVENTION

It has been discovered that performance information can be utilized for comparison of resolving an external object reference through a linking module against accessing the external object directly ("relocation processing"). The comparison allows determination of the more beneficial avenue for processing a runtime linked external object reference. Selectively indicating whether a runtime linked external object reference should be modified or not modified based at least in part on performance information provides improved application performance that outweighs additional runtime linking overhead incurred from relocation processing.

The determination can be based at least in part on a comparison realized with an inequality that reflects the relationship between increased runtime linking overhead and optimized runtime performance. Accordingly, runtime linked external object references are indicated as modifiable if relocation processing is determined to be more efficient.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIGS. 1A-1B depict modification of code to optimize runtime linking according to some realizations of the invention.

FIGS. 3A-3B depict execution of a code unit according to some realizations of the invention.

The use of the same reference symbols in different drawings indicates similar or identical items.

DESCRIPTION OF THE PREFERRED REALIZATION(S)

The description that follows includes exemplary systems, methods, techniques, instruction sequences and computer program products that embody techniques of the present invention. However, it is understood that the described invention may be practiced without these specific details. In other instances, well-known protocols, structures and techniques have not been shown in detail in order not to obscure the invention.

Figure 1A:
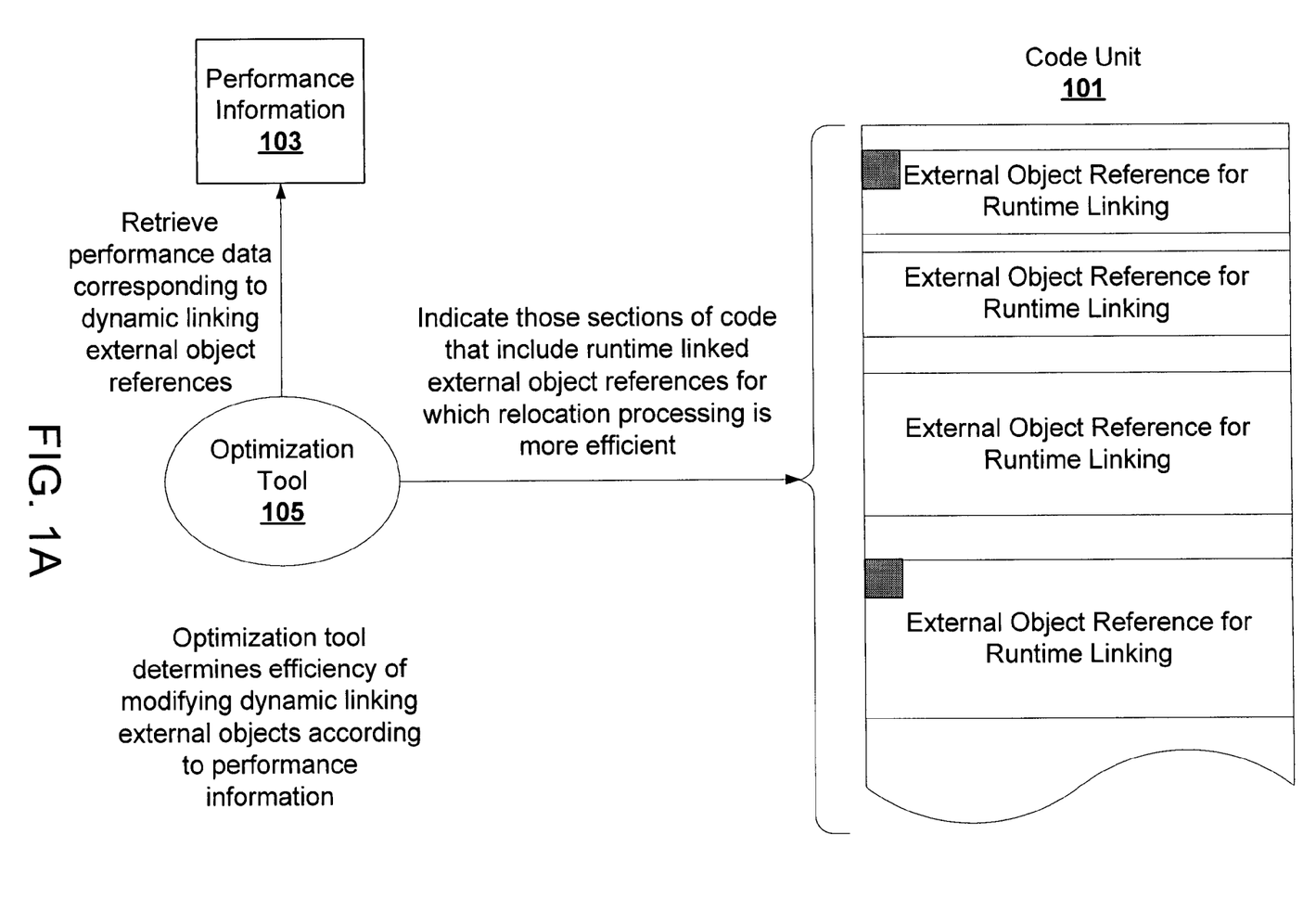
FIG. 1A depicts an optimization tool marking sections of a code unit for modification according to some realizations of the invention.
Figure 1B:
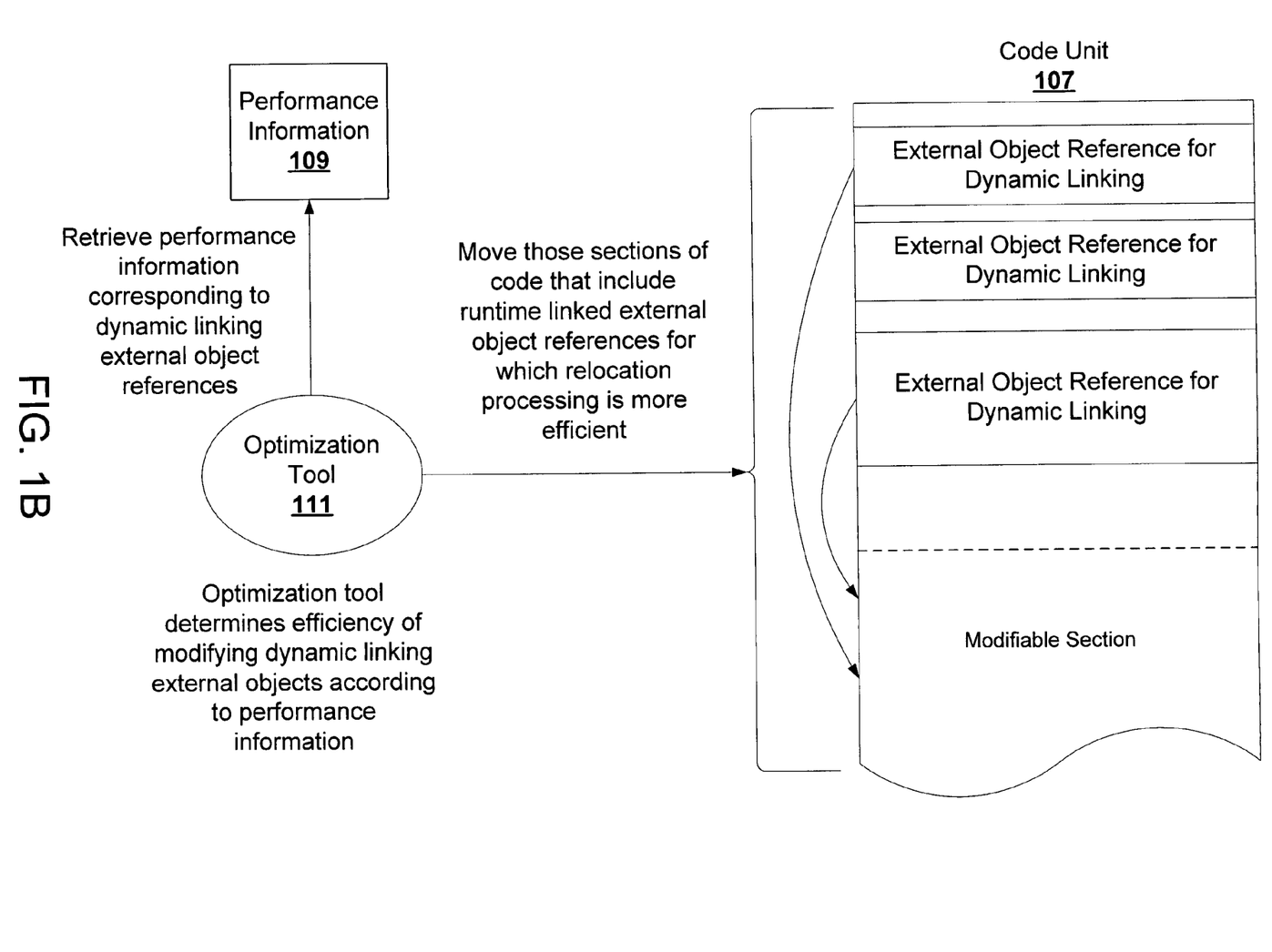
FIG. 1B depicts an optimization tool moving sections of code according to some realizations of the invention.

FIGS. 1A-1B depict modification of code to improve application performance according to some realizations of the invention. FIG. 1A depicts an optimization tool marking sections of a code unit for modification according to some realizations of the invention. A code unit 101 has been translated (i.e., target code, such as machine level code). The code unit 101 includes external object references for runtime linking. These external object references may be references to shared libraries, plug-in code units, drivers, etc. Performance information 103 (e.g., profile data for the code unit 101, optimization heuristics, etc.) corresponds to the code unit 101. Although the performance information 103 is depicted separate from the code unit 101, the performance information 103 may be embedded in the code unit 101. An optimization tool 105 retrieves the performance information 103 (perhaps some of the performance information 103 if it includes performance information for additional code units) that corresponds to the dynamic runtime linked external object references of the code unit 101.

The retrieved performance information includes one or more of execution frequency, execution time, load time, link time, etc. The performance information may correspond directly with an external object reference, with a sequence of instructions in the code unit 101 that include the external object reference, etc.

The optimization tool 105 determines the efficiency of modifying each of the runtime linked external object references of the code unit 101 according to the retrieved performance information. For example, assume T_res has been determined to be the time to perform relocation processing for an external object reference (e.g., an external function call, external data reference, etc.). Also assume that T_del has been determined to be the estimated improved execution time, according to retrieved performance information, for the one time execution of the relocated external object reference. For example, assume a code sequence executes within $t_1$ seconds. After relocation processing optimization, assume the same code sequence executes in $t_2$ seconds, $t_2 < t_1$. The estimated improvement in runtime of the code sequence is $t_1 - t_2 = T\_del$. Finally, N is the number of times that the sequence of instructions that include the external object reference are expected to be executed during runtime. If $T\_res < T\_del * N$, then runtime relocation processing should be introduced to optimize the external object reference.

For those external object references that can be modified to improve the code unit's runtime without significantly increasing runtime linking overhead, the optimization tool 105 marks those external object references to indicate that they should be modified during runtime linking ("runtime linking optimization candidate external object reference"). Markings are indicated in FIG. 1A with darkened blocks in the code unit 101. Various techniques can be employed to mark code units. For example, relocation entries are created in an ELF file (e.g., in a .rela.text section), and a .dynamic section of the ELF file is modified to indicate runtime relocation against the text section. In realizations of the invention, sequences of instructions ("code section") that include one or more runtime linking optimization candidate external object references are marked (e.g., a loop, a sub-routine call, etc.). Various realizations of the invention may factor in additional criteria that may prevent a runtime linking optimization candidate external object reference from being optimized. For example, in the case of a 64-bit PLT call optimization, scratch registers may be used in the optimized sequence of instructions. If the call's delay slot instruction uses one of these scratch registers, then runtime relocation processing may not be introduced.

Various techniques are implemented in realizations of the invention to "mark" the code unit. For example, a sequence of instructions that includes one or more candidate external object references may be explicitly marked as modifiable or unmodifiable. The default may be for all of the code to be unmodifiable unless a certain flag, bytecode, opcode, etc., precedes or delimits the instruction sequence. The default may be for the code to be modifiable unless marked and marking involves inserting delimiters around instructions sequences that should not be modified. For example, instruction sequences that include external object references and do not satisfy the above inequality are marked as read-only. Therefore, at runtime, the runtime linker uses a runtime linking table (e.g., a procedure link table) because the runtime linker cannot perform relocation processing on instruction sequences marked as read-only.

FIG. 1B depicts an optimization tool moving sections of code according to some realizations of the invention. In FIG. 1B, a code unit 107 includes runtime linked external object references, similar to FIG. 1A. However, the code unit 107 includes a modifiable section, unlike the code unit 101 in FIG. 1A. The modifiable section may be created by the optimization tool 111, may be created by a different software tool, may have been a part of the originally generated code unit 107, etc. The code unit 107 also has corresponding performance information 109, as with FIG. 1A. Similar to FIG. 1A, an optimization tool 111 retrieves the performance information 109 and utilizes the performance information to determine whether modifying a runtime linked external object reference to indicate the runtime location of the external object is more efficient than repeatedly resolving the external object reference. Instead of marking the code unit 101, the optimization tool 111 moves those external object references that are more efficient to modify to the modifiable section of the code unit 107, and modifications for referencing the moved instruction sequences are made to the code unit 107. Code units may be modifiable and include an un-modifiable section and realizations move those runtime linked external object references that are not relocation processing candidates to the un-modifiable sections. The optimization tool depicted in FIGS. 1A-1B may be part of a software development package, a compiler package, a stand-alone tool, etc.

Selectively indicating which runtime linked external object references should be modified and which should not be modified provides more control over program performance, with respect to runtime linking. This manipulation of runtime linking allows a developer to balance runtime linking overhead against runtime performance. In addition, limiting modification of runtime linked external object references to those that provide improved runtime performance, balances runtime optimization against sharability of the external objects. Without sharability of the external objects, each process that utilizes the external objects would possess its own copy, thus affecting application performance and memory footprint.

Selectively moving the code that requires runtime relocation processing to a modifiable section, while leaving the rest of the code unmodifiable, addresses the sharablility issue of the code unit (executable/shared object) by making only part of the code unsharable, which is relevant for shared objects.

Figure 2:
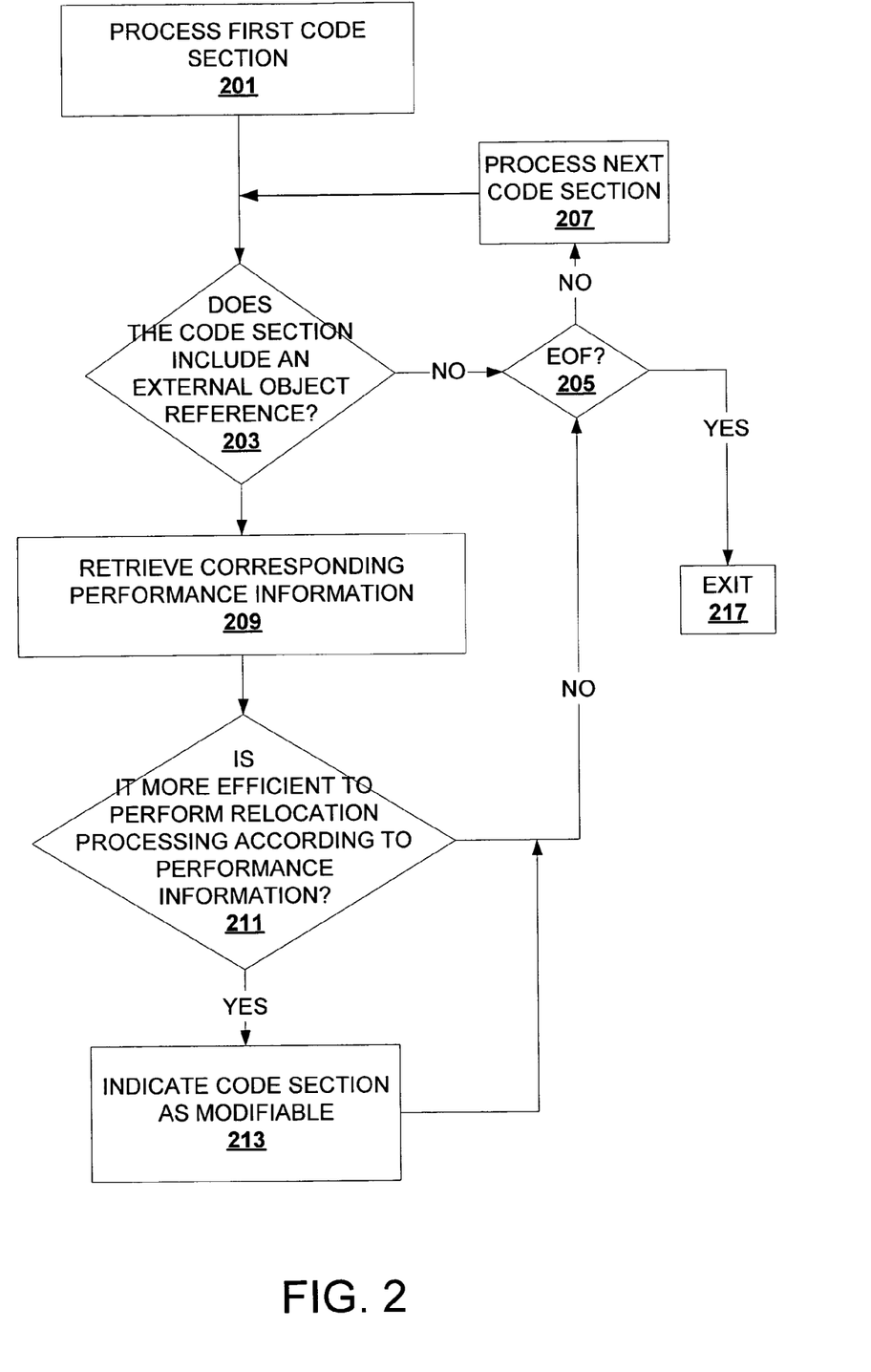
FIG. 2 depicts a flowchart for indicating which code sections include runtime link optimization candidate external object references according to some realizations of the invention.

FIG. 2 depicts a flowchart for indicating which code sections include runtime link optimization candidate external object references according to some realizations of the invention. At block 201, a first code section is processed. At block 203, it is determined if the code section includes an external object reference. If the code section does not include an external object reference, then control flows to block 205. If the code section includes an external object reference, then control flows to block 209.

At block 205, it is determined if an end of file is encountered (or end of code unit). If the end of file is encountered, then control flows to block 217, where optimization processing exits. If the end of file is not encountered, then control flows to block 207.

At block 207, the next code section is processed. Control flows from block 207 back to block 203.

At block 209, the performance information that corresponds to the code section is retrieved. At block 211, it is determined if it is more efficient to perform relocation processing according to the performance information. If it is not more efficient to perform relocation processing, then control flows to block 205. If it is more efficient to perform relocation processing, then control flows to block 213. At block 213, the code section is indicated as modifiable (writeable). Control flows from block 213 to block 205.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, code unit sections may not be processed sequentially or individually. In addition, realizations of the invention process code unit sections that include multiple external object references and determine whether optimization should be performed on the code unit section based at least in part on summing the performance information of all of the external object references for a code unit section. In addition, various realizations of the invention operate on different granularities of code. For example, a code is parsed into lexical tokens and the appropriate lexical tokens, which correspond to runtime linked external object references, are tagged to indicate they are modifiable.

The following provides an example of optimizing code by selectively modifying code sections. Assume that a printf statement will be executed frequently enough to satisfy the previously discussed inequality. Code that includes a call to the printf statement would change as follows:

call printf [PLT]→call printf

If the first function call were encountered, then a procedure link table would be used to find printf (call with redirection). If the second printf is encountered without the [PLT] designation, then relocation processing is performed on the printf statement. A scenario that involves software limited by hardware (e.g., 64-bit instructions executed on a 32-bit platform), may involve relatively greater modification. For example, the following illustrates relocation processing on a call to an external function printf when a call instruction submits to address spanning limitations. The following call printf [PLT]

is converted to

| | |
|---|---|
| sethi % hh(printf), % g1 | !relocation with respect to symbol foo |
| sethi % lm(printf) , % g5 | |
| or % g1, % hm(printf), % g1 | |
| sllx % g1, 32, % g1 | |
| or % g1, % g5, % g5 | |
| jmpl % g5 + % lo (printf), % o7 | |

The next example provides example code for relocating an external object that is an external variable k. Assume that a global offset table (GOT) is utilized. A runtime linker places the external objects into the GOT. To access an external data object during execution, object addresses from the GOT are loaded into execution space and then the objects are loaded. The following example code:

| | |
|---|---|
| sethi % hi(k), % g1 | !relocation refers to k as an offset !in GOT |
| ld [% g4 + % lo(k)], % o1 | !% g4 holds GOT address; address of k !is loaded into % o1 |
| ld [% o1], % o0 | !load k from its address in GOT to % o0 | can be converted to either the following:

| | |
|---|---|
| sethi % hi(k), % g1 | !relocation refers to absolute address !of k (known only at runtime) |
| ld [% g1 + % lo(k)], % o0 | !just one load to get value of k in !% o0 | or converted to the following to address span limitations:

sethi % hh(k), % g1 or % g1, % hm(k), % g1 sllx % g1, 32, % g1 sethi % lm(k), % o1 or % g1, % o1, % g1 ld [% g1+% lo(k)], % o0

For position independent code, a compiler generates instruction sequences for getting the address of the GOT for every function that references external data objects. If every GOT data reference in a given function is modified by relocation processing, then the GOT instruction sequences can be eliminated. Although the examples utilize Solaris® based code, realizations of the invention are not limited to any particular platform or language.

Figure 3A:
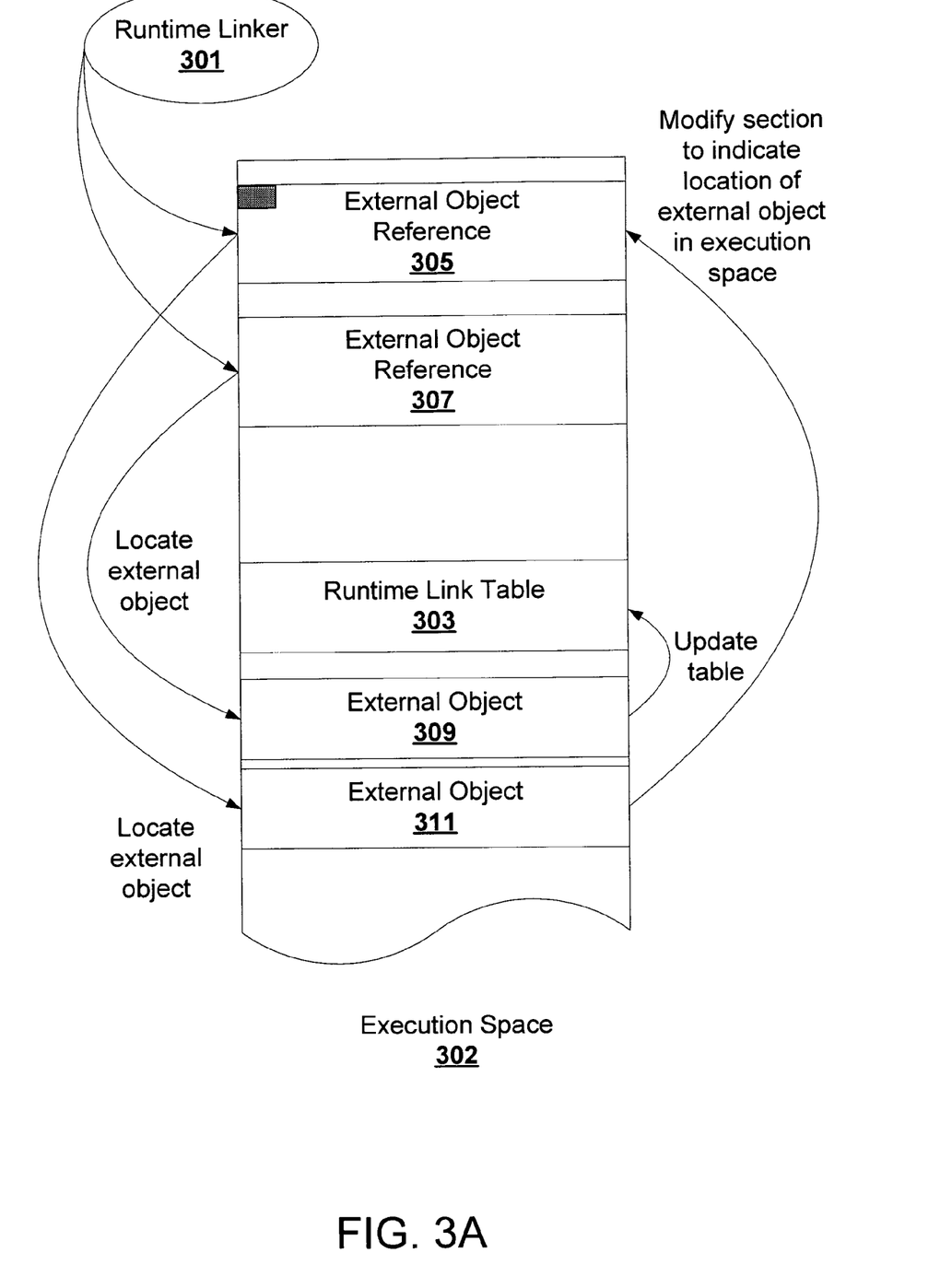
FIG. 3A depicts a runtime linker operating on an executing code unit that includes a marked external object reference according to some realizations of the invention.
Figure 3B:
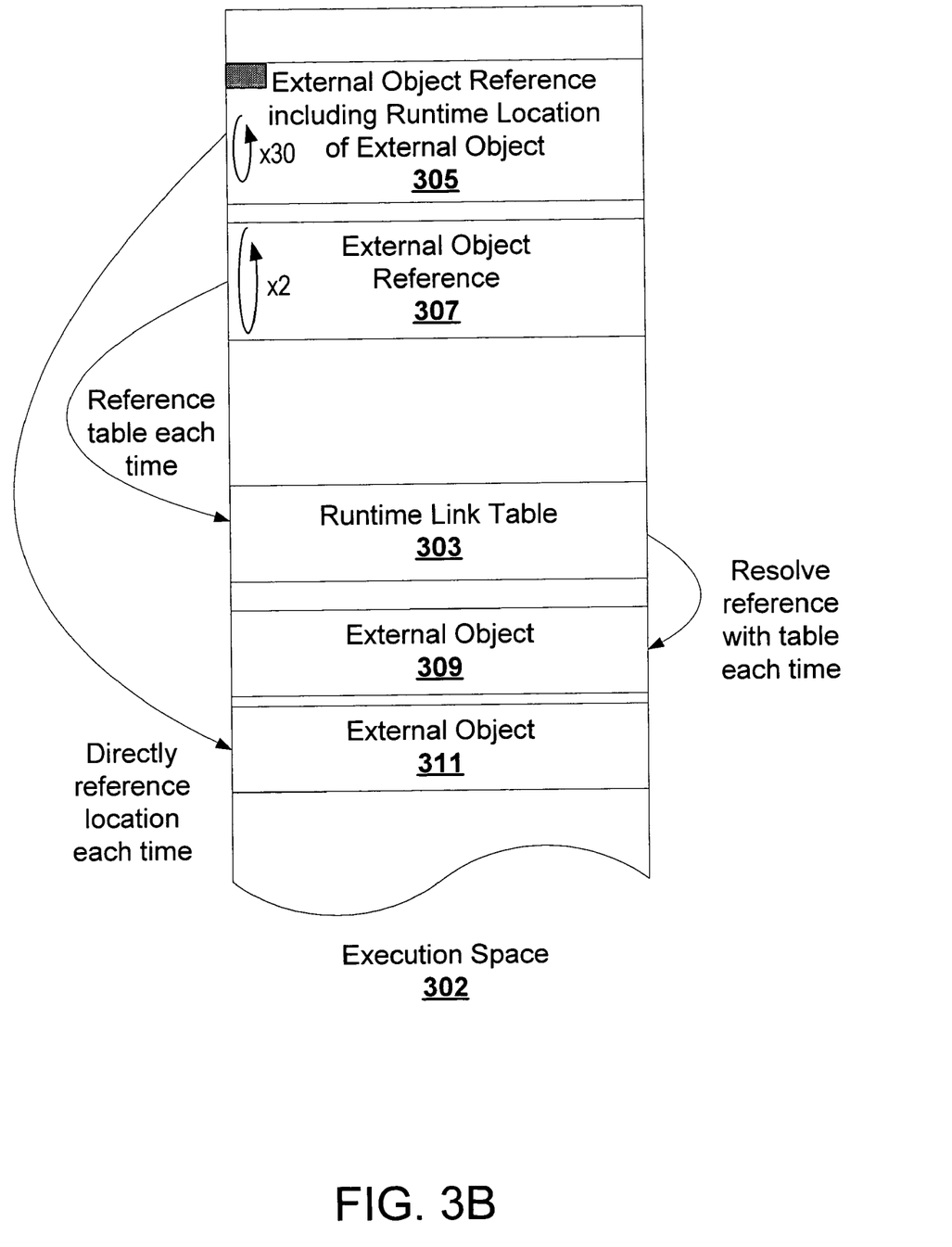
FIG. 3B depicts execution of a code unit after the runtime linker has modified an external object reference according to some realizations of the invention.

FIGS. 3A-3B depict execution of a code unit according to some realizations of the invention. FIG. 3A depicts a runtime linker operating on an executing code unit that includes a marked external object reference according to some realizations of the invention. A runtime linker 301 corresponds to a code unit's execution space 302. The runtime linker 301 encounters a marked code unit section 305 that includes an external object reference. The external object reference 305 is marked as modifiable. The runtime linker 301 locates the corresponding external object 311 in the execution space 302. The runtime linker 301 then modifies the external object reference 305 to indicate the runtime location of the external object 311 (e.g., virtual address, physical address, page number and offset, etc.). The runtime linker 301 then encounters a code unit section 307, which is not marked as modifiable, that includes an external object reference. The runtime linker 301 locates an external object 309 that corresponds to the external object reference 307. The runtime linker 301 updates a runtime link table 303 to indicate the runtime location of the external object 309.

FIG. 3B depicts execution of a code unit after the runtime linker has modified an external object reference according to some realizations of the invention. In FIG. 3B, the code unit section that includes the external object reference 305, which has been modified to indicate runtime location of the corresponding external object, is executed 30 times. Each time the code unit section that includes the external object reference 305 is encountered, execution references the runtime location of the external object 309. The code unit section 307 that includes the external object reference is illustrated as being executed twice. Each time the code unit section 307 is executed, the runtime link table 303 is accessed. With the runtime link table 303, the external object reference of code section 307 is resolved to the runtime location of the external object 309.

Although time is initially spent modifying the code section 305, that time is insignificant compared to the amount of time that would have been spent resolving the external object reference with the runtime link table 303 each time that code section is encountered during runtime. Likewise, the time spent resolving the external object reference in the code section 307 both times it is encountered is less than the time that may have been spent modifying the code section 307. Runtime linking overhead is reduced for the most frequently executed code section, while any possible runtime linking delays suffered by the less frequently executed code section are limited by the limited frequency of execution. Although the illustrations of FIGS. 3A-3B suggest an executable code unit, shared objects may also include references to other external objects, hence the described invention can be applied to executables and/or shared objects (e.g., dynamic libraries).

The described invention may be provided as a computer program product, or software, that may include a machine-readable medium having stored thereon instructions, which may be used to program a computer system (or other electronic devices) to perform a process according to the present invention. A machine readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 4:
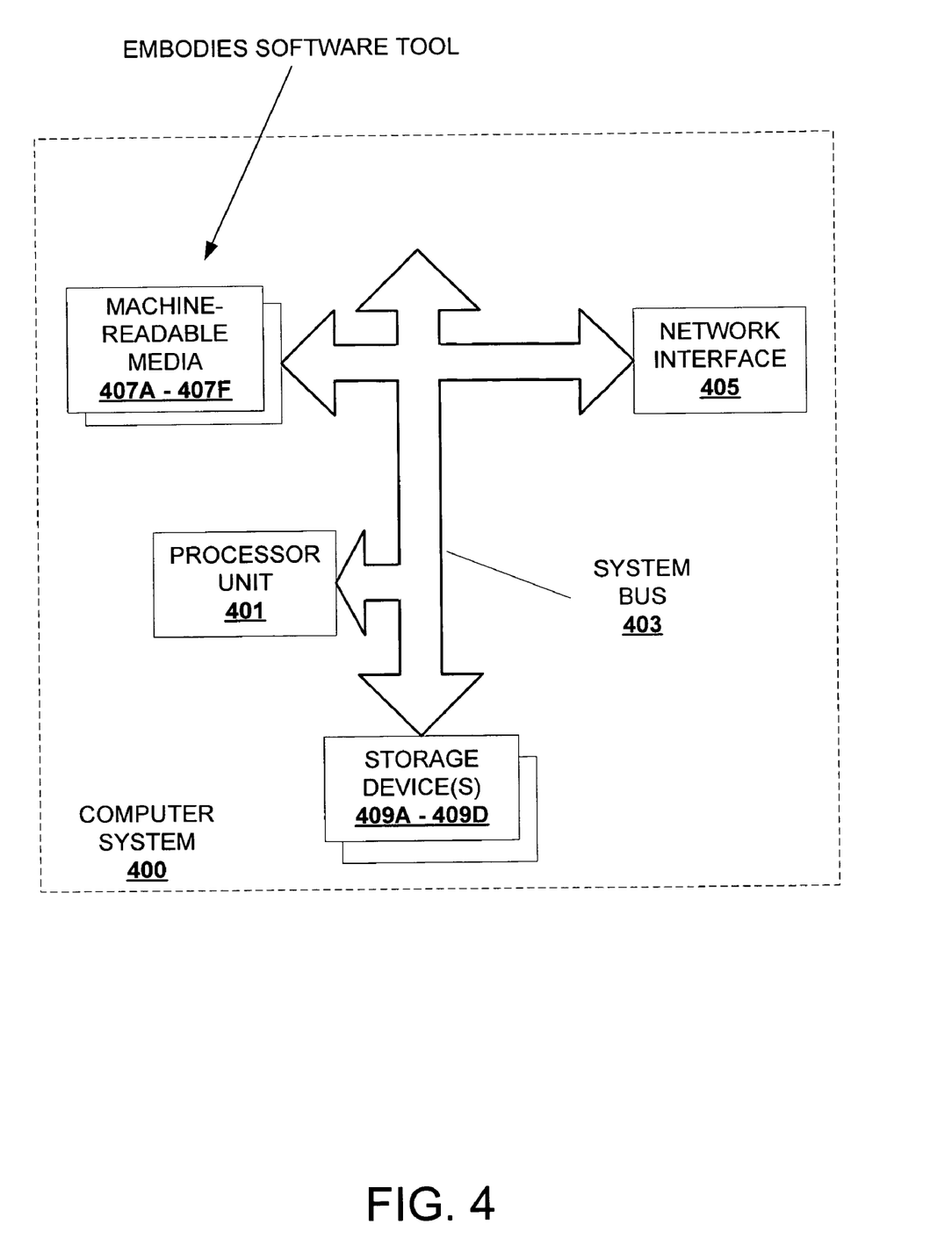
FIG. 4 depicts an exemplary computer system according to some realizations of the invention.

FIG. 4 depicts an exemplary computer system according to some realizations of the invention. A computer system 400 includes a processor unit 401 (possibly including multiple processors). The computer system 600 also includes a system memory 407A-407F (e.g., one or more of cache, SRAM DRAM, RDRAM, EDO RAM, DDR RAM, EEPROM, etc.), a system bus 403 (e.g., LDT, PCI, ISA, etc.), a network interface 405 (e.g., an ATM interface, an Ethernet interface, a Frame Relay interface, etc.), and a storage device(s) 409A-409D (e.g., optical storage, magnetic storage, etc.). Realizations of the invention may include fewer or additional components not illustrated in FIG. 4 (e.g., video cards, audio cards, additional network interfaces, peripheral devices, etc.). The processor unit 401, the storage device(s) 409A-409D, the network interface 405, and the system memory 407A-407F are coupled to the system bus 403. The system memory 407A-407F depicted in FIG. 4 embodies a software tool, such as an optimization tool. The embodied software tool operates in accordance with the preceding description.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A software tool, embodied in a machine-readable medium, comprising:
    instructions, embodied in at least one machine-readable storage medium and executable by at least one processing unit, that selectively mark one or more runtime linked external object references to be modified during runtime linking by relocation processing when a corresponding runtime improvement exceeds runtime linking overhead incurred from modifying the one or more runtime linked external object references during runtime, the corresponding runtime improvement and the runtime linking overhead based at least in part on performance information about one or more code units that include the runtime linked external object references.

2. The software tool of claim 1, wherein the runtime improvement is based, at least in part on, a difference in runtime of the code units with and without relocation processing of the external object references.

3. The software tool of claim 1, wherein said selectively mark includes one or more of marking the code units, marking the runtime linked external object references, and moving the runtime linked external object references to a different location in the code units.

4. The software tool of claim 1, wherein the code units include one or more of executable code units and shared objects.

5. The software tool of claim 4, wherein the shared objects include dynamic libraries.

6. The software tool of claim 1, wherein the performance information includes one or more of execution time of the code units, execution frequency of the code units, and runtime linking overhead from modification of runtime linked external object references.

7. The software tool of claim 6, wherein the runtime linking overhead for a runtime linked external object reference is execution time to replace the runtime linked external object reference with an indication of the external object reference's runtime location.

8. The software tool of claim 1, wherein the performance information includes one or more of optimization heuristics and code profiling data.

9. The software tool of claim 1, wherein the runtime linked external object references include one or more of cross-module calls, references to shared variables, references to shared data structures, and references to libraries.

10. The software tool of claim 1, wherein the software tool includes one or more of an optimizer, a linker, a loader, and a link-editor.

11. A method comprising:
    determining, utilizing at least one processing unit, whether a runtime linked external object reference can be modified, by relocation processing, to indicate the runtime linked external object's runtime location more efficiently than the runtime location can be resolved during execution by comparing runtime linking overhead against improved runtime performance from the modification and determining the modification is more efficient when the improved runtime performance exceeds the incurred runtime linking overhead, the improved runtime performance and the runtime linking overhead determined based at least in part on performance information corresponding to the external object reference; and
    causing, utilizing the at least one processing unit, the runtime linked external object reference to be modified to indicate a runtime location of the runtime linked external object if modification of the runtime linked external object reference is determined to be more efficient.

12. The method of claim 11, wherein said causing includes one or more of marking a code unit that includes the runtime linked external object reference, marking the runtime linked external object reference, and moving the runtime linked external object reference within the code unit that includes the runtime linked external object reference.

13. The method of claim 12, wherein said making the code unit comprises:
    creating relocation entries in a .rela text section of an ELF file, wherein the code unit includes the ELF file; and
    modifying a .dynamic section of the ELF file to indicate runtime relocation against the text section.

14. The method of claim 12, wherein a section of the code unit is marked as modifiable and the runtime linked external object reference is moved to the modifiable section of the code unit, wherein the remaining sections of the code unit are not modifiable.

15. The method of claim 12, wherein the code units includes an executable code unit or a shared object.

16. The method of claim 15, wherein the shared object includes a dynamic library.

17. The method of claim 11, wherein said resolved comprises determining the runtime linked external object's runtime location from a linking module.

18. The method of claim 11, wherein the performance information includes one or more of heuristics and profile data.

19. The method of claim 11 further comprising modifying the runtime linked external object references to indicate runtime locations of the runtime linked external objects.

20. The method of claim 11 embodied as a computer program product encoded in one or more machine-readable media.

21. A method comprising:
    modifying, during execution of a code unit, a first set of runtime linked external object references, utilizing at least one processing unit, to indicate runtime locations of external objects referenced by the external object references, wherein the external object references were indicated as modifiable because of a determination, based on performance information of the code unit, that relocation processing of the first set of runtime linked external object references is more efficient than resolving the runtime locations during execution; and
    resolving a second set of runtime linked external object references, utilizing the at least one processing unit, wherein the resolved external object references were not indicated as modifiable because of a determination, based on performance information of the code unit, that relocation processing of the second set of runtime linked external object references is not more efficient than resolving the runtime locations during execution.

22. The method of claim 21, wherein the code unit includes a shared object or an executable code unit.

23. The method of claim 21, wherein the code unit includes the first and second set of runtime linked external object references.

24. The method of claim 21, wherein the code unit references a second code unit that includes the first and second set of runtime linked external object references.

25. The method of claim 21 further comprising indicating the first set of runtime linked external object references as modifiable, utilizing the at least one processing unit, in accordance with a determination that modification of the first set of runtime linked external object references improves runtime performance of the code unit that includes the first set of runtime linked external object references, wherein the improvement in runtime performance exceeds runtime linking overhead incurred from the modification.

26. The method of claim 21, wherein indicating includes one or more of marking a code unit that includes the runtime linked external object references, marking the runtime linked external object references, and moving the runtime linked external object references within the code unit that includes the runtime linked external object references.

27. The method of claim 21, wherein the performance information includes one or more of heuristics and profile data.

28. The method of claim 21 embodied as a computer program product encoded in one or more machine-readable media.

29. An apparatus comprising:
    system memory; and
    a first set of instructions, embodied in the system memory and executable by at least one processing unit, that determine to modify a runtime linked external object reference, by relocation processing, to indicate a runtime location of the runtime linked external object when a corresponding runtime improvement exceeds runtime linking overhead incurred from modifying the runtime linked external object reference, the corresponding runtime improvement and the runtime linking overhead based at least in part on performance information of a code unit that includes the runtime linked external object reference.

30. The apparatus of claim 29, further comprising:
    a second set of instructions, embodied in the system memory and executable by the at least one processing unit, that indicate the runtime linked external object reference as modifiable in accordance with the determination.

31. The apparatus of claim 29, further comprising:
    a second set of instructions, embodied in the system memory and executable by the at least one processing unit, that evaluate the code unit for the performance information.

32. A computer program product embodied on one or more machine-readable media, the computer program product comprising:
    a first sequence of instructions executable by at least one processing unit to analyze performance information about a code unit that includes one or more runtime linked external object references to determine if modifying by relocation processing, during execution of the code unit, a runtime linked external object reference to indicate a corresponding runtime linked external object's runtime location at least when improvement in execution time of the code unit exceeds runtime linking overhead incurred from modification; and
    a second sequence of instructions executable by the at least one processing unit to indicate, in accordance with the first sequence of instructions, those runtime linked external object references to be modified by relocation processing during execution of the code unit.

33. The computer program product of claim 32, further comprising:
    a third sequence of instructions executable by the at least one processing unit to modify those runtime linked external object references indicated as to be modified.

34. The computer program product of claim 32, wherein the second sequence of instructions to indicate includes one or more of the second sequence of instructions to mark those runtime linked external object reference to be modified, the second sequence of instructions to mark one or more code sections that include those runtime linked external object references, and the second sequence of instructions to move those runtime linked external object references to a modifiable section of the code unit.

35. A computer program product embodied on one or more machine-readable media, the computer program product comprising:
    a first sequence of instructions, executable by at least one processing unit, that determine runtime linked external object references in at least one code unit are modifiable by relocation processing when relocation processing of the runtime linked external object references is more efficient than resolving runtime locations corresponding to the runtime linked external object references during execution, that determine runtime locations corresponding to the modifiable runtime linked external object references, and that modify the modifiable runtime linked external object references to indicate their respective corresponding runtime locations; and a second sequence of instructions, executable by the at least one processing unit, that resolve un-modifiable runtime linked external object references in the at least one code unit to their corresponding runtime locations.

36. The computer program product of claim 35, wherein relocation processing of the runtime linked external object references is more efficient than resolving runtime locations corresponding to the runtime linked external object references during execution if improvement in execution time from modification exceeds runtime linking overhead incurred from modification.

37. The computer program product of claim 35, wherein the runtime linked external object references include one or more of cross-module calls, references to shared variables, references to shared data structures, and references to libraries.

* * * * *